United States Patent Office 3,417,121
Patented Dec. 17, 1968

3,417,121
SUBSTITUTED 1,2-SILTHIACYCLOPENTANES AND
PROCESS FOR PRODUCING THE SAME
Götz Koerner, Mulheim (Ruhr), Germany, assignor to
Th. Goldschmidt A.-G., Essen, Germany
No Drawing. Filed June 1, 1966, Ser. No. 554,326
Claims priority, application Germany, June 10, 1965,
G 43,836
10 Claims. (Cl. 260—448.2)

This invention generally relates to organosilicon compounds and is particularly directed to novel 1,2-silthiacyclopentanes and a process for manufacturing such compounds.

The substituted 1,2-silthiacyclopentanes with which this invention is concerned may be represented by the general formula

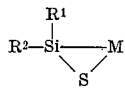

wherein M is a hydrocarbon group which links the silicon and the sulphur atom through three carbon atoms, and $R^1$ and $R^2$ stand for alkyl or alkoxy of at the most six carbon atoms or phenyl. The hydrocarbon group of M may be of the branched type while $R^1$ and $R^2$ may be the same or different.

The production of ω-mercaptoalkyl containing organosilicon compounds has previously been disclosed in U.S. patent application Serial No. 277,680, now U.S. Patent 3,314,982. These compounds may be subjected to distillation at reduced pressure, for example for purification purposes, without decomposing. The boiling points of these compounds, dependent on the substituents contained therein, are within a range of about 100 to 200° C. at a pressure of 10 to 15 mm. Hg.

It has now surprisingly been found that heating of ω-mercaptoalkyl containing organosilicon compounds in the presence of certain catalysts results in ring closure under the formation of substituted 1,2-silthiacyclopentanes.

Accordingly, it is a primary object of this invention to produce novel 1,2-silthiacyclopentanes.

Another object of this invention is to provide a novel process for preparing 1,2-silthiacyclopentanes.

Generally, it is an object of this invention to improve on the art of 1,2-silthiacyclopentanes as presently practiced.

Briefly, and in accordance with this invention, the novel 1,2-silthiacyclopentanes of the invention are represented by the formula

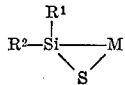

wherein M is —(CH₂)₃— or

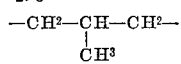

and $R^1$ and $R^2$ stand for alkyl or alkoxy of at the most six carbon atoms or phenyl. $R^1$ and $R^2$ may be the same or different.

The inventive process is characterized by heating mercaptans of the general formula

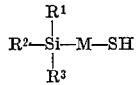

wherein $R^1$ and $R^2$ have the indicated meaning;
M is a hydrocarbon which connects the silicon and sulphur atoms through three carbon atoms; and
$R^3$ is alkoxy of at the most three carbon atoms;

to temperatures above 150° C., whereafter the alcohol thus formed is removed by distillation. The reaction is advantageously carried out in the presence of an alkali metal alcoholate or alkali metal mercaptide. The preferred temperature range for the reaction is 170 to 210° C. Sodium ethylate has been found to be a particularly effective catalyst for the purposes of the inventive reaction. For this reason, this catalyst is preferably used in carrying out the reaction. Other suitable catalysts are ammonium salts of strong mineral acids such as, for example, $(NH_4)_2SO_4$. The preferred amount of catalysts is 1 to 5 mole percent. The reaction proceeds more slowly in the absence of the catalysts, however, it still takes place.

The inventive reaction results in the splitting off of the alcohol $R^3H$. Since the reaction which takes place in the inventive process is an equilibrium reaction, it is recommended to remove the alcohol $R^3H$ as quickly as possible and preferably quantitatively from the reaction mixture as the alcohol is formed. This is rendered possible, for example, by distilling the alcohol together with a solvent which forms an azeotrope with the alcohol. Particularly suitable solvents are benzene and toluene.

Since it is somewhat difficult to completely remove the alcohol from the reaction mixture, the invention 1,2-silthiacyclopentanes, which are formed in the reaction, usually contain certain amounts of the corresponding ω-mercaptoalkysilane. However, the silthiacyclopentanes produced in accordance with this invention may be satisfactorily separated from the starting compounds. This, for example, may be effected by careful distillation through a column.

The symbols in the above formulae may for example have the following meanings: $R^1$ and $R^2$ which, as previously set forth, may be the same or different, may thus stand for methyl, ethyl, propyl, isopropyl, butyl, isobutyl, pentyl, isopentyl or hexyl. If $R^1$ and/or $R^2$ stand for alkoxy, then the hydrocarbon group of the alcohol from which the alkoxy is derived may have the previously mentioned meaning. $R^1$ and/or $R^2$, however, may also be phenyl. It will be understood by a person skilled in this particular art that these groups may be substituted as long as the substituent does not interfere with the course of the inventive reaction.

$R^3$ is alkoxy derived from methanol, ethanol, propanol or isopropanol. M is preferably the group

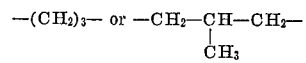

Structural examples of the compounds which may be produced in accordance with the inventive reaction are as follows:

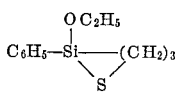 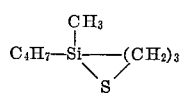

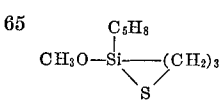 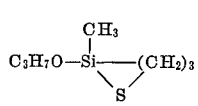

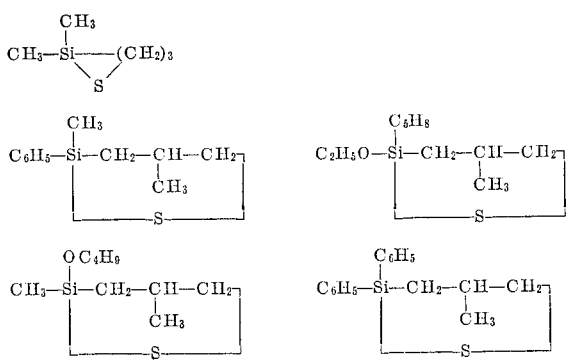

The compounds produced in accordance with this invention belong to a group of heterocyclic compounds which hitherto had not been known. The formation of these heterocyclic compounds is surprising, since the linking or binding angles as they occur in the compounds deviate from the known angles. For this reason, such compounds cannot be represented by the customary atom models, for example the so-called Stuart models, to wit, models made from wood or the like materials which, substantially on scale, are intended to represent the atomic structure and also take account of the linking angle.

The inventive 1,2-silthiacyclopentanes are particularly suitable as adhesion transmitters. They thus considerably improve the adhesion of synthetic resins, for example lacquers, particularly on the basis of unsaturated polyester or epoxy resins, on surfaces consisting of or containing silicate or metal. The structure of the 1,2-silthiacyclopentane can be demonstrated by analysis, molecular weight determination and infrared spectral analysis. Primarily, however, it is established by the fact that addition of the split-off alcohol to the 1,2-silthiacyclopentane yields quantitatively the starting compound even in the absence of a catalyst.

These substituted 1,2-silthiacyclopentanes are generally capable of reacting with compounds having an active hydrogen atom. The reaction may be represented by the following formula:

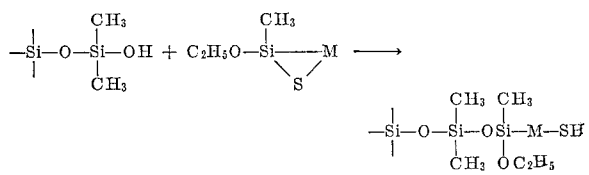

The inventive products are thus suitable for introducing terminal Si—M—SH groups.

The invention will now be described by several examples, it being understood, however, that these examples are given by way of illustration and not by way of limitation and that many changes may be effected in the process conditions without affecting in any way the scope and spirit of the appended claims.

EXAMPLE I

Preparation of 1-methyl-1-ethoxy-1,2-silthiacyclopentane 416 g. (2 moles) of γ-mercaptopropylmethyldiethoxysilane are admixed with 1305 g. of Na, the Na being dissolved in the form of $NaOC_2H_5$ in 30 g. of ethyl alcohol. The mixture is introduced into a three-neck flask. The flask is fitted with drop funnel, thermometer and a column having a height of 120 cm. This reaction vessel is placed in an oil bath which is heated to about 120° C. An amount of benzene is then added in dropwise manner through the drop funnel so that at a sump temperature of about 180° C. sufficient reflux sets in at the head of the column. After about 30 minutes, the distillate, whose boiling point at first is at 67° C., slowly transfers into the receiving vessel. As soon as the reflux becomes weaker at the head of the column, a fresh small amount of benzene is added, whereby the sump temperature should not decrease below 170° C. The amounts are chosen so that 1200 g. of distillate are obtained in 70 hours. In doing so, the boiling point rises to just below 80° C. The distillate contains after the indicated period 63.7 g. of ethanol. This means that 33.7 g. of ethanol have split off. This corresponds to a reaction rate of 36.5% of the theory. The reaction product is separated by a twice repeated fractionated distillation through a column of 60 cm. height.

Boiling point at 12 mm. Hg: 65° C., yield 70 g. (21.6% of the theoretical amount).

*Analysis.*—($SiC_6H_{14}OS$), calculated: Si: 17.28%; C: 44.5%; H: 8.64%; S: 19.75%; $C_2H_5O$: 27.8%; M.W.: 162. Found: Si: 17.0%; C: 44.1%; H: 8.8%; S: 19.3%; $C_2H_5O$: 27.2%; M.W. 167.

The residue which is of higher boiling point consists of unreacted γ - mercaptopropylmethyldiethoxysilane which contains a small amount of 1-methyl-1-ethoxy-1,2-silthiacyclopentane, as was ascertained by gas chromatographic methods.

EXAMPLE II

Preparation of 1,1-diethoxy-1,2-silthiacyclopentane 476 g. (2 moles) of γ-mercaptopropyltriethoxysilane are stirred with 1.38 g. of sodium (0.06 gram atoms, corresponding to 3 mole percent) for a period and at about 100° C. until the major portion of the sodium has been dissolved. This mixture, with the addition of benzene, is treated in the same manner as described in connection with Example I. Again, the amounts are adjusted so that about 1200 grams of distillate are obtained in 70 hours. As in the previous example, the boiling point rises to just below 80° C. The distillate contains 27.45 g. of ethanol. This corresponds to a conversion rate of 29.8% of the theoretical amount. The reaction product is separated by fractionate distillation through a column of 60 cm. height.

Boiling point at 12 mm. Hg: 86° C.

*Analysis.*—($SiC_7H_{16}O_2S$), calculated: Si, 14.58; C, 43.76; H, 8.33; S, 16.67; $C_2H_5O$, 46.9; M.W., 192. Found: Si, 14.6; C, 43.4; H, 8.6; S, 15.8; $C_2H_5O$, 47.1; M.W., 183.

EXAMPLE III

Preparation of 1,4-dimethyl-1-ethoxy-1,2-silthiacyclopentane 444 g. (2 moles) of γ-mercapto-β-methylpropylmethyldiethoxysilane are stirred with 1.38 g. of sodium (0.06 gram atoms) at 100° C. until the major portion of the sodium had been dissolved. The mixture is then treated in the same manner as described in Example I. The amounts are chosen so that 1200 grams of distillate are obtained in about 70 hours. For purification purposes, the reaction product is twice subjected to distillation through a column of 60 cm. height.

Boiling point at 12 mm. Hg: 72° C.

*Analysis.*—($SiC_7H_1OS$), calculated: Si, 15.91; C, 47.73; H, 9.09; S, 18.18; M.W., 176. Found: Si, 15.7; C, 47.2; H, 9.1; S, 18.0; M.W., 182.

While specific embodiments of the invention have been shown and described in detail to illustrate the application of the inventive principles, it will be understood that the invention may be embodied otherwise without departing from such principles.

What is claimed is:

1. 1,2-silthiacyclopentanes of the formula

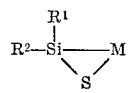

wherein M stands for —$(CH_2)_3$— or

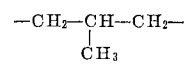

and $R^1$ and $R^2$ are alkyl or alkoxy of at the most 6 carbon atoms or phenyl.

2. 1-methyl-1-ethoxy-1,2-silthiacyclopentane.
3. 1,1-diethoxy-1,2-silthiacyclopentane.
4. 1,4-dimethyl-1-ethoxy-1,2-silthiacyclopentane.
5. A process of preparing 1,2-silthiacyclopentanes of the general formula

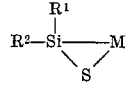

wherein
M is a hydrocarbon which connects the silicon and the sulphur atoms through three carbon atoms; and $R^1$ and $R^2$ stand for alkyl or alkoxy of at the most six carbon atoms or phenyl, which comprises heating mercaptans of the general formula

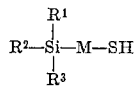

wherein M, $R^1$ and $R^2$ have the indicated meaning and $R^3$ is alkoxy of at the most three carbon atoms, to a temperature of above 150° C. and removing the alcohol $R^3H$ thus formed by distillation.

6. A process as claimed in claim 5, wherein the reaction is carried out in the presence of a catalyst in the form of an alkali metal alcoholate or alkali metal mercaptide.

7. A process as claimed in claim 6, wherein the catalyst is sodium ethylate.

8. A process as claimed in claim 5, wherein the heating is carried out in a temperature range of about between 170 to 210° C.

9. A process as claimed in claim 5, wherein the alcohol $R^3H$ is distilled azeotropically.

10. A process as claimed in claim 9, wherein the alcohol is azeotropically distilled with benzene or toluene.

References Cited

UNITED STATES PATENTS 3,313,837  4/1967  Rossmy et al. _____ 260—448.8

TOBIAS E. LEVOW, *Primary Examiner.*

P. F. SHAVER, *Assistant Examiner.*

U.S. Cl. X.R.

106—287; 117—72, 75; 260—448.8